United States Patent
Cheung et al.

(10) Patent No.: US 9,970,824 B2
(45) Date of Patent: May 15, 2018

(54) SENSOR PROBE WITH ANTI-ICING

(71) Applicant: Pratt & Whitney Canada Corp., Longueuil (CA)

(72) Inventors: Kin-Leung Cheung, Toronto (CA); Peter Lance, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 304 days.

(21) Appl. No.: 14/753,363

(22) Filed: Jun. 29, 2015

(65) Prior Publication Data

US 2016/0377487 A1 Dec. 29, 2016

(51) Int. Cl.
G01K 7/00 (2006.01)
G01K 1/20 (2006.01)
G01K 1/08 (2006.01)
G01K 13/00 (2006.01)
H05B 3/18 (2006.01)

(52) U.S. Cl.
CPC .................. G01K 1/20 (2013.01); G01K 1/08 (2013.01); G01K 13/00 (2013.01); H05B 3/18 (2013.01); H05B 2203/003 (2013.01); H05B 2214/02 (2013.01)

(58) Field of Classification Search
USPC .......................................... 374/147, 208, 163
See application file for complete search history.

(56) References Cited

U.S. PATENT DOCUMENTS

| | | | |
|---|---|---|---|
| 2,970,475 A | 2/1961 | Werner | |
| 4,152,938 A * | 5/1979 | Danninger | G01K 13/022 374/138 |
| 5,653,538 A * | 8/1997 | Phillips | G01K 13/02 374/135 |
| 6,672,152 B2 | 1/2004 | Rouse et al. | |
| 6,974,250 B2 | 12/2005 | Severson | |
| 7,357,572 B2 | 4/2008 | Benning et al. | |
| 7,441,948 B2 * | 10/2008 | Bernard | G01K 13/028 374/135 |
| 8,256,284 B2 | 9/2012 | Vozhdaev et al. | |

(Continued)

FOREIGN PATENT DOCUMENTS

WO 2014167237 A1 10/2014

OTHER PUBLICATIONS

Canadian Intellectual Property Office; Office Action dated Mar. 28, 2017 re: Application No. 2,927,639.

(Continued)

*Primary Examiner* — Mirellys Jagan
(74) *Attorney, Agent, or Firm* — Norton Rose Fulbright Canada LLP

(57) ABSTRACT

Sensor probes with anti-icing and methods for manufacturing such sensor probes are disclosed. An exemplary sensor probe comprises a probe sensor, a probe body housing the probe sensor and an anti-icing device. The anti-icing device is bonded to and covers at least part of the probe body for preventing ice from forming on the probe body. The anti-icing device comprises a heating element thermally insulated from the probe body by a thermal insulator and a hydrophobic coating covering the heating element and defining an outer surface for exposure to an airflow. The heating element may be deposited using a direct write process.

18 Claims, 7 Drawing Sheets

(56) References Cited

U.S. PATENT DOCUMENTS

| | | | |
|---|---|---|---|
| 8,517,601 B2* | 8/2013 | Stothers | H05B 1/0236 374/110 |
| 8,560,203 B2 | 10/2013 | Calandra et al. | |
| 2003/0005779 A1* | 1/2003 | Bernard | G01K 13/028 73/861.65 |
| 2005/0273292 A1* | 12/2005 | Severson | G01K 13/028 702/130 |
| 2014/0014640 A1 | 1/2014 | Calder | |
| 2014/0050247 A1 | 2/2014 | Herman et al. | |
| 2015/0093244 A1 | 4/2015 | Wigen | |
| 2015/0103867 A1* | 4/2015 | Meis | B64D 15/20 374/183 |
| 2016/0023771 A1* | 1/2016 | Riquet | B64D 15/00 244/134 E |

OTHER PUBLICATIONS

English translation of International Publication No. WO 2014/167237 dated Oct. 16, 2014; accessed on Apr. 10, 2017; https://www.google.ca/patents/WO2014167237A1?cl=en&dq=WO2014167237&hl=en&sa=X&ved=0ahUKEwirwdiwlZrTAhUL4YMKHS5VAgQQ6AEIHDAA.

Jeff Brogan, Smart Deposition Process Integrates Sensors and Heaters into Coatings, Thermal Spray Coatings in Emerging Technologies, Nov.-Dec. 2014, pp. 55-58, vol. 9, Issue 4, ASM International, New York, USA.

Norton Rose Fulbright Canada LLP; Response dated Sep. 12, 2017 to Office Action dated Mar. 28, 2017 re: Canadian Patent Application No. 2,927,639.

* cited by examiner

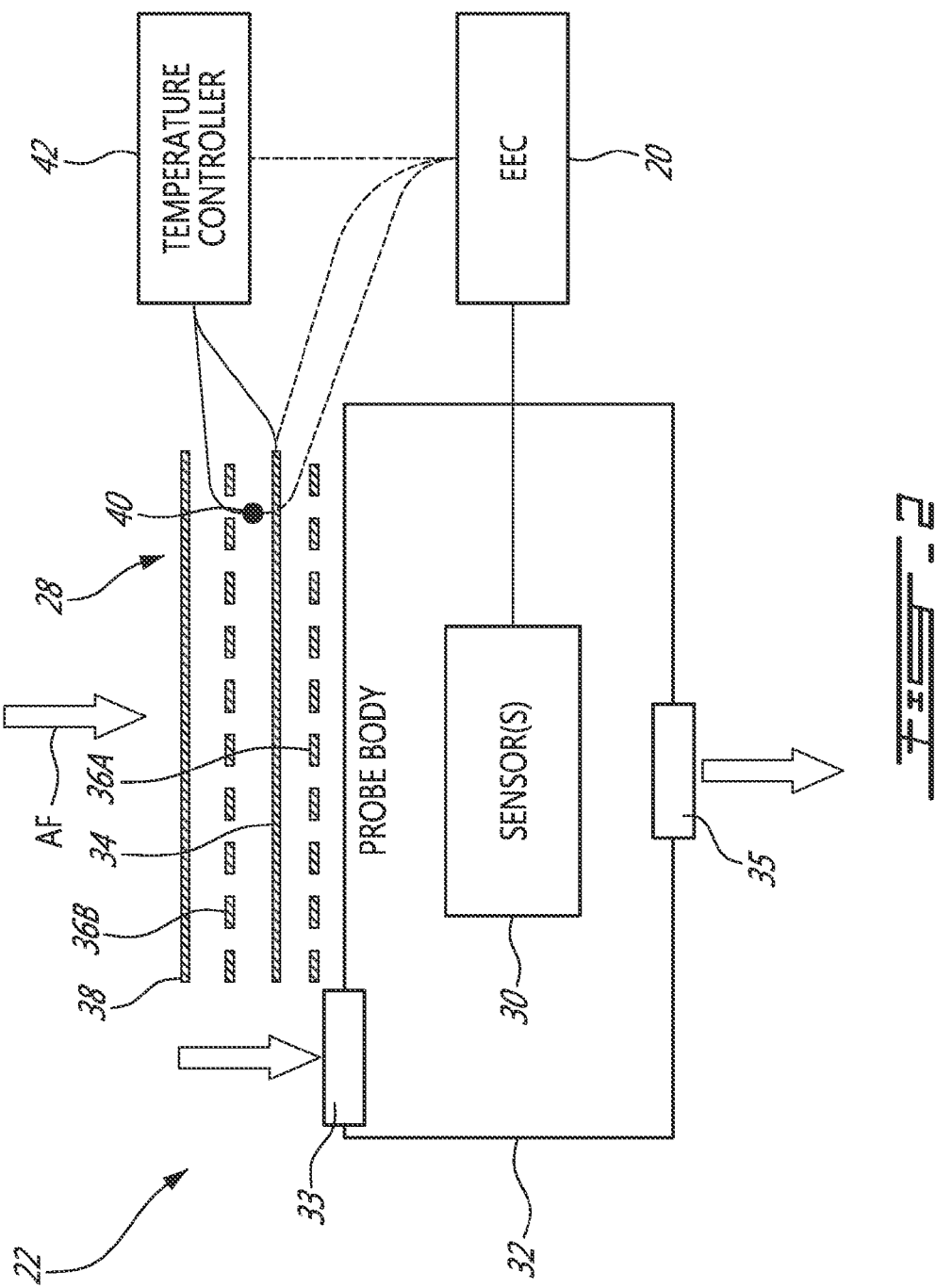

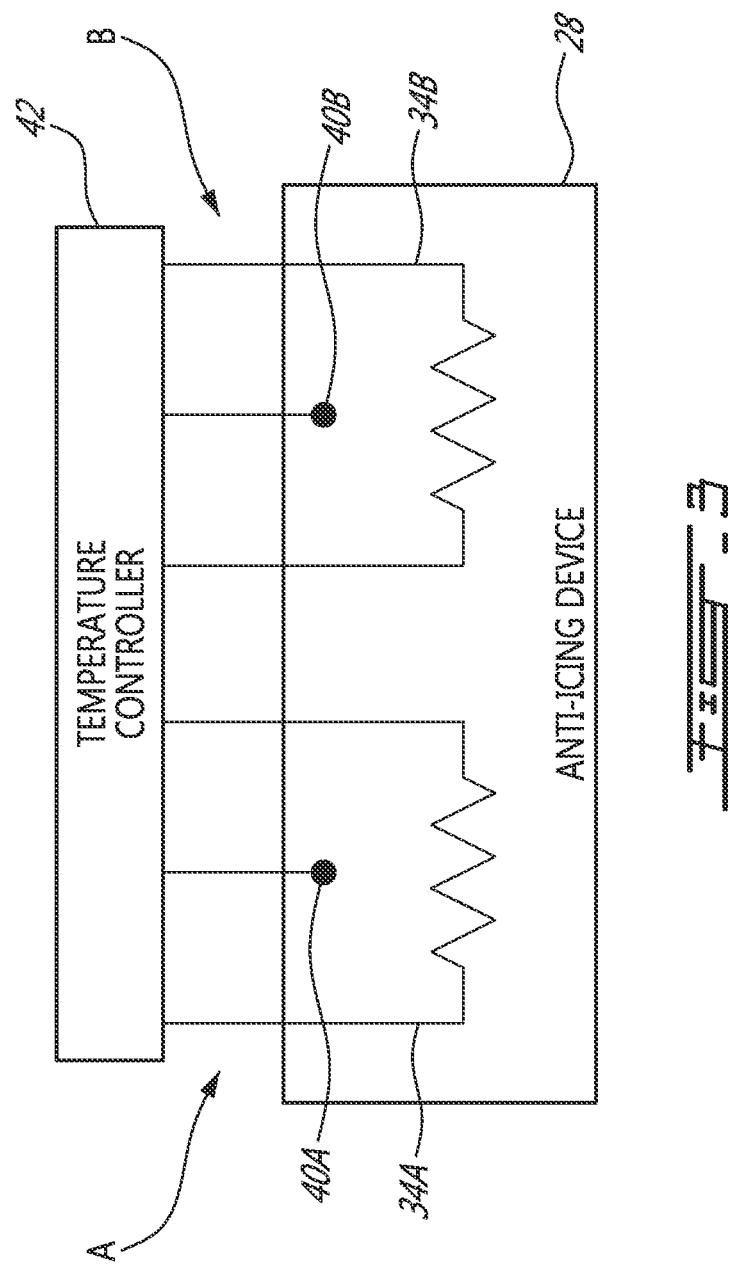

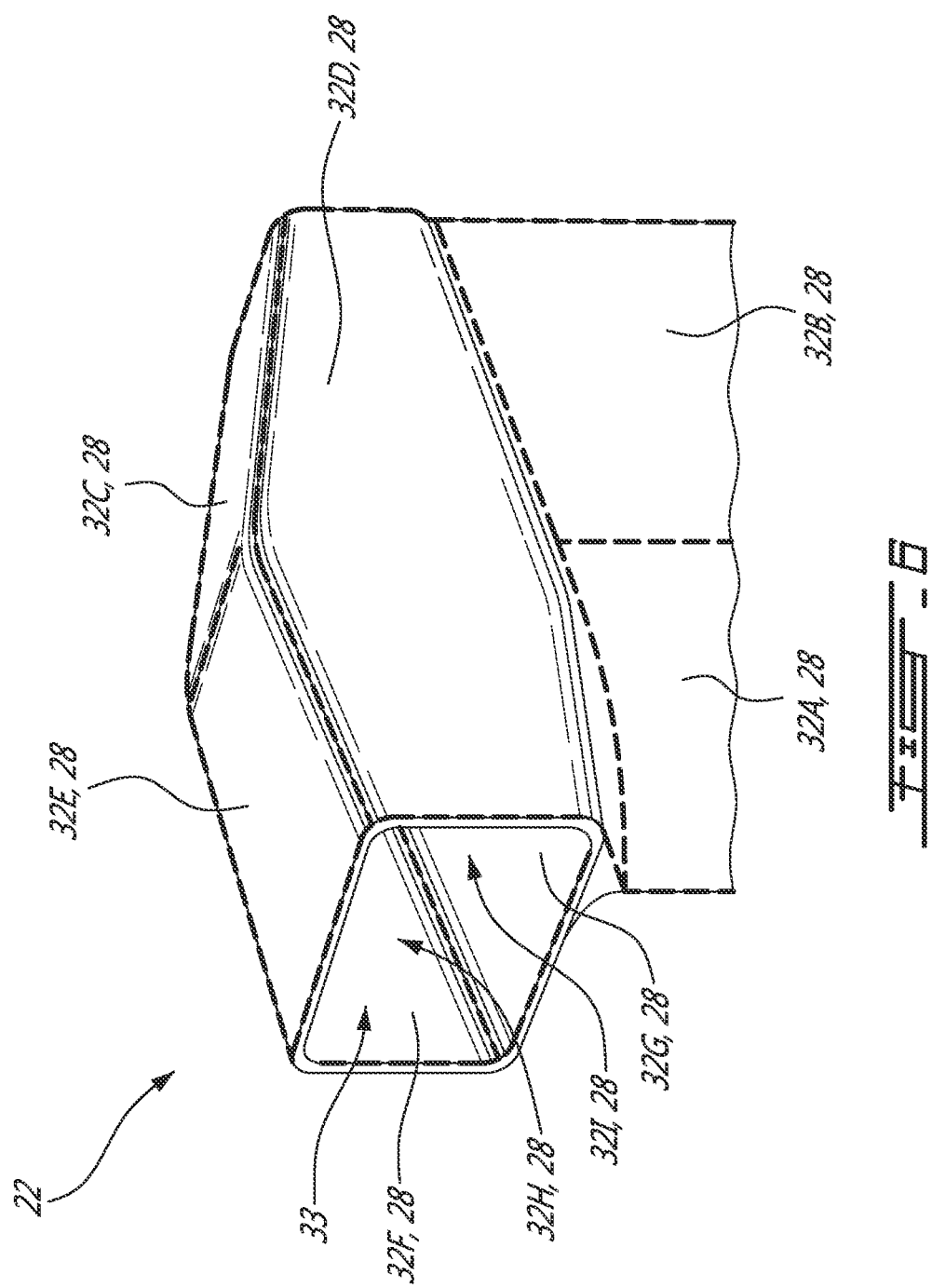

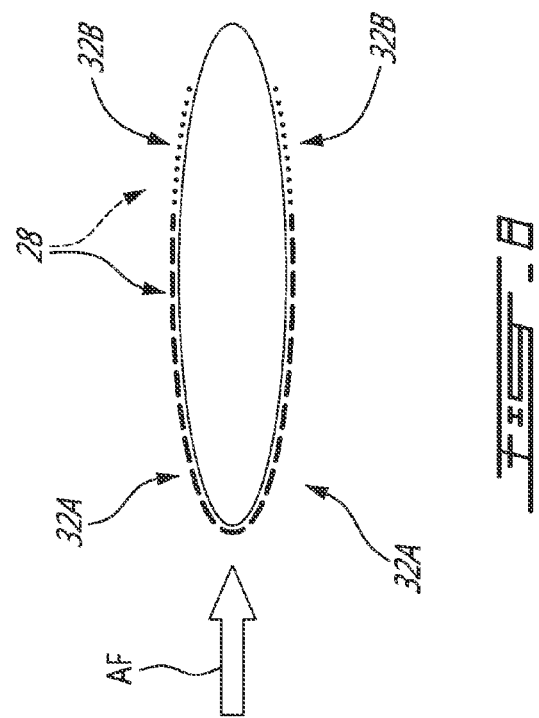
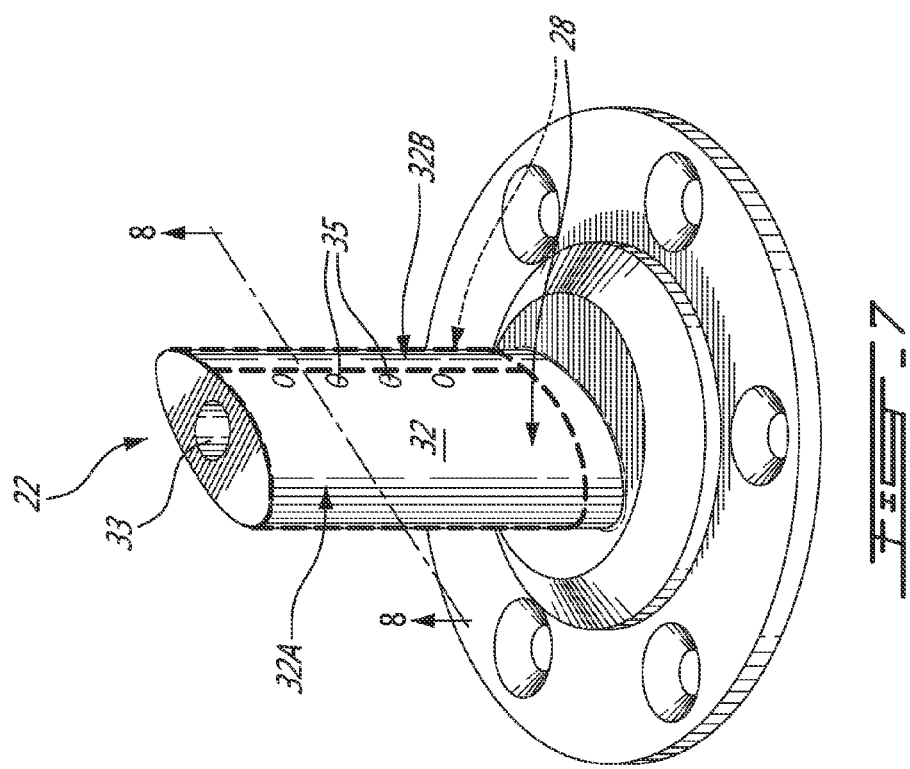

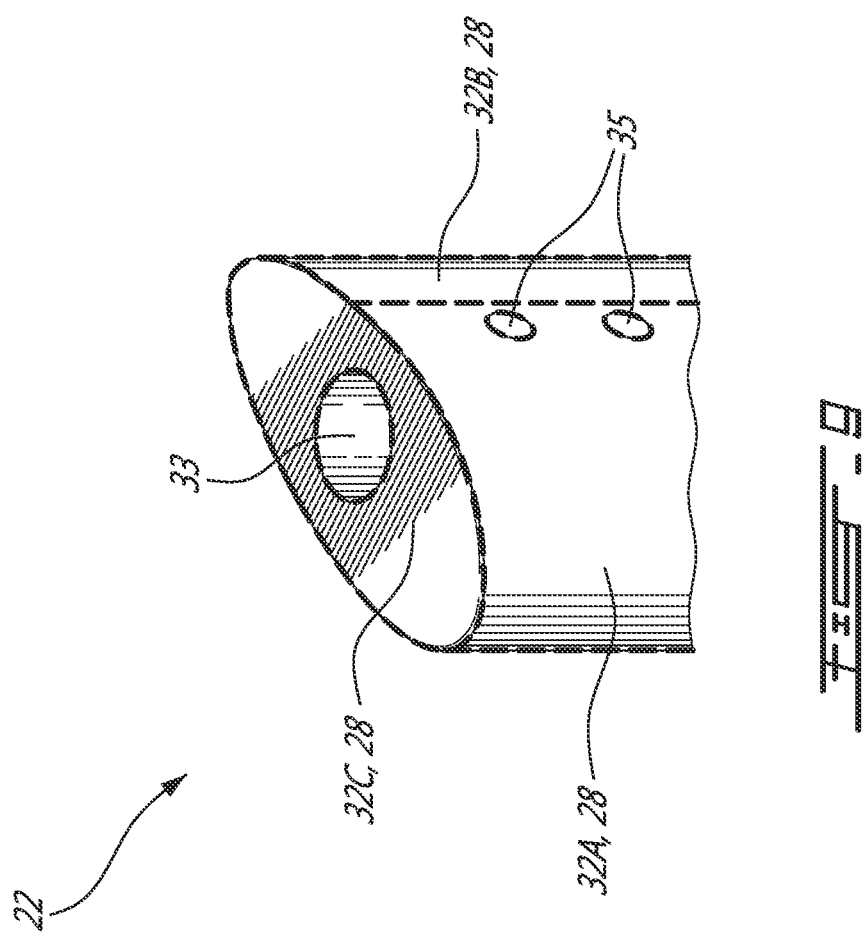

SENSOR PROBE WITH ANTI-ICING

TECHNICAL FIELD

The disclosure relates generally to sensor probes exposed to airflows in aircraft applications, and more particularly to preventing icing of such probes.

BACKGROUND OF THE ART

An aircraft turbofan engine typically has a temperature sensor incorporated in a probe which measures total temperature ($TT_O$) at an inlet of the engine. The total temperature is the temperature of a free stream of air entering the inlet of the engine. The total temperature measurement may be provided to an engine controller and may be used to assist in controlling the engine during operation.

A $TT_O$ probe may be prone to icing during operation of an aircraft to which the turbofan engine is mounted. Accordingly, $TT_O$ probes may be equipped with a heater for anti-icing purpose. However, the operation of such heater may cause the ambient air inside of the probe to also be heated and therefore can cause the measured temperature to be inaccurate.

Improvement is therefore desirable.

SUMMARY

In one aspect, the disclosure describes a sensor probe with anti-icing. The sensor probe comprises:
 a probe sensor;
 a probe body housing the probe sensor and configured to extend into an airflow; and
 an anti-icing device bonded to and covering at least part of the probe body for preventing ice from forming on the probe body, the anti-icing device defining an outer surface for exposure to the airflow and comprising a heating element thermally insulated from the probe body.

In another aspect, the disclosure describes a temperature probe with anti-icing for extending into a gas path of a gas turbine engine. The temperature probe comprises:
 a temperature sensor;
 a probe body housing the temperature sensor and configured to extend into the gas path of the gas turbine engine and be exposed to an airflow; and
 an anti-icing device bonded to and covering at least part of the probe body for preventing ice from forming on the probe body, the anti-icing device comprising:
  a heating element thermally insulated from the probe body; and
  a hydrophobic coating covering the heating element for being heated by the heating element, the hydrophobic coating being electrically insulated from the heating element and defining an outer surface for exposure to the airflow.

In another aspect, the disclosure describes a method of manufacturing an anti-icing device bonded to and covering at least part of a probe body of a sensor probe for extending into an airflow. The method comprises:
 installing a heating element on the probe body and thermally insulating the heating element from the probe body; and
 covering the heating element with a coating defining an outer surface for exposure to the airflow.

Further details of these and other aspects of the subject matter of this application will be apparent from the detailed description and drawings included below.

DESCRIPTION OF THE DRAWINGS

Reference is now made to the accompanying drawings, in which:

FIG. 2 shows a schematic representation of a sensor probe of the engine of FIG. 1 including an exploded representation of an anti-icing device;

FIG. 3 shows a schematic representation of the anti-icing device of FIG. 2 having a dual channel configuration;

FIG. 6 shows a perspective view of part of the probe of FIG. 4 indicating exemplary locations where the anti-icing device of FIG. 2 may be disposed on the probe;

FIG. 7 shows a perspective view of another exemplary probe indicating exemplary locations where the anti-icing device of FIG. 2 may be disposed on the probe;

FIG. 8 is a cross-sectional profile of the probe of FIG. 7 taken along line 8-8 in FIG. 7; and FIG. 9 shows a perspective view of part of the probe of FIG. 7 indicating exemplary locations where the anti-icing device of FIG. 2 may be disposed on the probe.

DETAILED DESCRIPTION

The present disclosure relates to devices for providing anti-icing to sensor probes (e.g., temperature and/or pressure probes) that are exposed to (e.g., ambient) airflows in aircraft applications. The present disclosure also relates to methods of manufacturing such devices. Aspects of the present disclosure may be used with total temperature ($TT_O$) probes that are typically located at or near an inlet of an aircraft engine such as a turbofan gas turbine engine. In some embodiments, the anti-icing devices disclosed herein may provide an anti-icing function without significantly affecting the accuracy of a temperature measurement acquired by a temperature sensor of such probes. In some embodiments, the anti-icing devices disclosed herein may provide an anti-icing function while requiring relatively less energy than existing anti-icing heaters for such probes.

Aspects of various embodiments are described through reference to the drawings.

Figure 1:
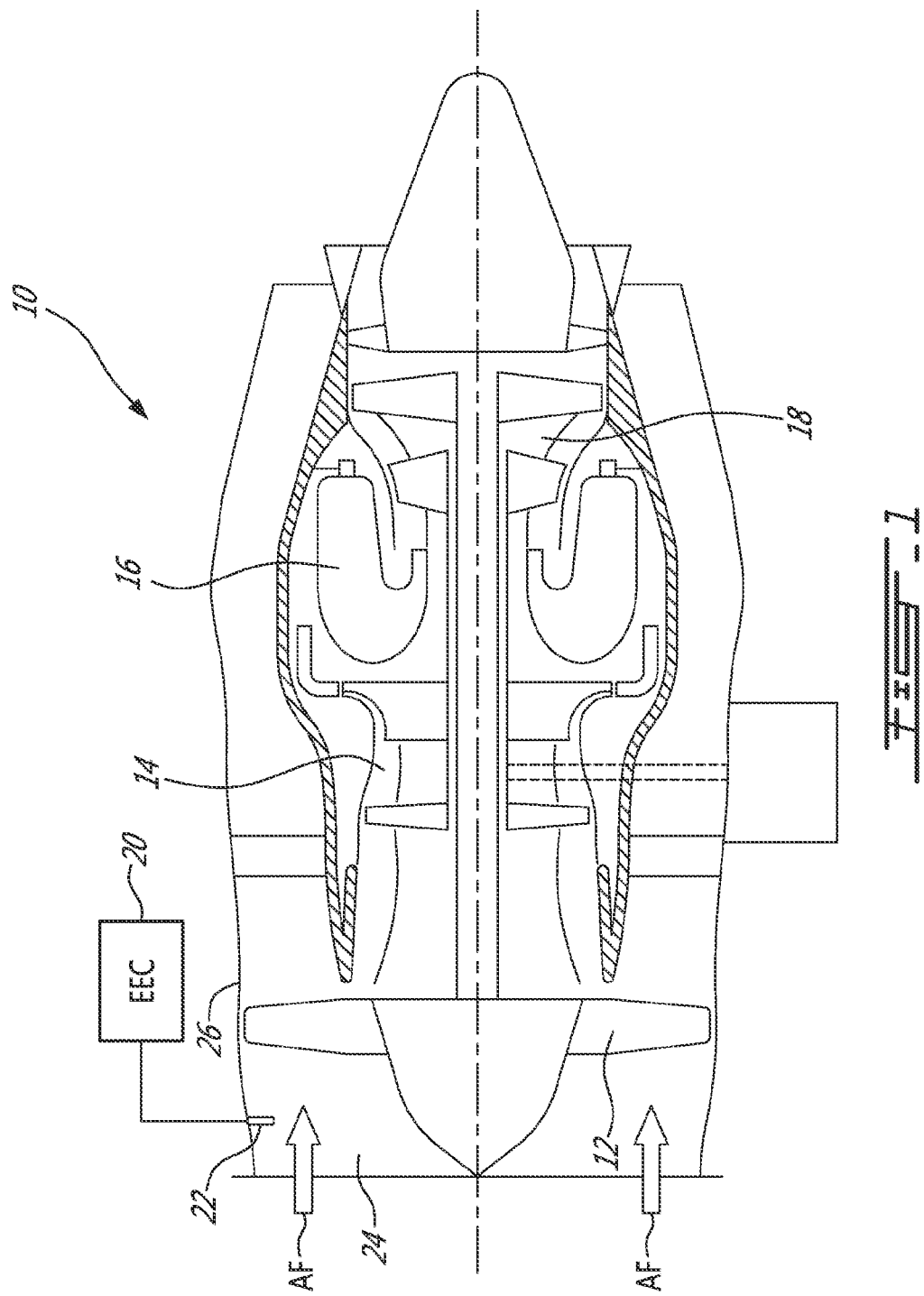
FIG. 1 shows an axial cross-section view of a turbofan gas turbine engine.

FIG. 1 illustrates an exemplary gas turbine engine 10 of a type preferably provided for use in subsonic flight, generally comprising, in serial flow communication, a fan 12 through which ambient air (i.e., airflow referenced as "AF" in FIG. 1) is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may comprise a conventional or other type of gas turbine engine suitable for use in aircraft applications. For example, engine 10 may comprise a turbofan or a turboprop type of engine.

Engine 10 may comprise one or more control device(s) such as electronic engine controller(s) (referred hereinafter as "EEC 20") and related accessories that control at least some aspects of performance of engine 10. EEC 20 may for example be configured to make decisions regarding the control of engine 10 until a pilot wishes to or is required to intervene. EEC 20 may be configured to provide optimum engine efficiency for a given flight condition. As data processors, EEC 20 may include one or more microcontrollers or other suitably programmed or programmable logic circuits.

EEC 20 may regulate at least some aspect(s) of operation of engine 10 based on one or more input variables. EEC 20 may, for example, be configured to receive multiple input variables representative of current flight conditions including air density, total temperature of inlet air ($TT_0$), pressure of inlet air (Po) throttle lever position, engine temperatures, engine pressures, and potentially many other parameters. Accordingly, EEC 20 may receive one or more signals from one or more sensors associated with various aspects of the operation of engine 10 such as, for example, sensor probe 22 (referred hereinafter as "probe 22"). Such signals may be received as input by EEC 20 and analyzed using one or more data processors according to stored machine-readable instructions. Engine parameters such as fuel flow, stator vane position, bleed valve position, and others may be computed from this data and applied as appropriate by, for example, generating suitably-configured output signals and providing them to relevant device(s) associated with the engine 10.

Probe 22 may be configured to provide signals representative of one or more measured properties such as, for example, temperatures and/or pressure associated with airflow AF. Probe 22 may be configured to provide a signal representative of a total temperature ($TT_0$) of a free stream of air entering an inlet of engine 10. In various embodiments, probe 22 may comprise one or more temperature sensors and/or one or more pressure sensors. For example, in some embodiments, probe 22 may be of the type commonly known as a "$T_0/P_0$" probe. Probe 22 may be disposed near or within inlet 24 of engine 10 and may extend radially inwardly from casing 26 for example. Alternatively, probe 22 may be of a type suitable for mounting on an aircraft at a location other than in engine 10 such as on the outside of an aircraft fuselage for example. Depending on the ambient conditions, probe 22 may be prone to an accumulation of ice forming thereon where such ice formation may affect the measurement(s) acquired by probe 22.

FIG. 2 shows a schematic representation of probe 22 including an exploded representation of anti-icing device 28. Anti-icing device 28 may serve to prevent significant ice formation from occurring on probe 22 in some environmental conditions. It should be understood that anti-icing device 28 may not absolutely prevent all ice formation(s) from occurring on probe 22 and some ice may still form on probe 22 in some conditions. Accordingly, expressions such as "preventing ice from forming" and "anti-icing" as used herein are intended to include hindering the formation of ice so that an amount of ice accumulated on probe 22 may be reduced or substantially eliminated through the use of anti-icing device 28.

Probe 22 may comprise one or more probe sensors 30 (referred hereinafter as "probe sensor 30") and probe body 32 housing probe sensor 30. Probe sensor 30 may comprise a temperature sensor and/or a pressure sensor as explained above. Probe body 32 may be configured to extend into and be exposed to airflow AF. Probe body 32 may comprise one or more inlets 33 and one or more outlets 35 to permit the passage of air through probe body 32 so that sensor 30 may be exposed to some of the air of airflow AF entering inlet 33 and exiting outlet 35. The ability to measure temperature accurately via sensor 30 may be an important factor for EEC 20 in order to achieve or maintain an efficient operation of engine 10.

An exploded representation of an exemplary anti-icing device 28 is shown for illustration purpose however an actual anti-icing device 28 may be relatively thin and may substantially conform to the outer shape of probe body 32. Anti-icing device 28 may be bonded to and cover at least part of probe body 32 and may be configured to prevent ice from forming on probe body 32. Anti-icing device 28 may comprise one or more heating elements 34 thermally insulated from probe body 32 by thermal insulator 36A. Thermal insulator 36A may comprise a ceramic material, polymeric material and/or other thermally-insulating material that is bonded to (e.g., deposited onto) probe body 32. Thermal insulator 36A may prevent at least some heat from being transferred from heating element(s) 34 into probe body 32. For example, thermal insulator 36A may prevent significant heating of the air around sensor 30 by heating element(s) 34 so that the temperature measurement acquired by sensor 30 may not be significantly affected by the operation of heating element(s) 34 of anti-icing device 28. Anti-icing device 28 may comprise optional coating 38 covering at least part of heating element(s) 34 and defining an outer surface heated by heating element(s) 34 for exposure to airflow AF. Coating 38 may have hydrophobic properties as explained below.

Anti-icing device 28 may be manufactured using one or more additive manufacturing processes (e.g., direct write) as described below. In some embodiments, a method of manufacturing anti-icing device 28 bonded to and covering at least part of probe body 32 of probe 22 for extending into airflow AF may comprise: installing heating element(s) 34 on probe body 32 and thermally insulating heating element (s) 34 from probe body 32; and covering heating element(s) 34 with (e.g., hydrophobic) coating 38 where coating 38 defines an outer surface for exposure to airflow AF.

Using the methods disclosed herein, anti-icing device 28 may be incorporated into new probes 22 or may be retrofitted into existing conventional probes. On some conventional probes for example, a retrofitted anti-icing device 28 may be operationally connected to and controlled by the existing controller that was used to control some other conventional heating element(s) of the conventional probe.

In some embodiments, installing heating element(s) 34 may comprise embedding heating element(s) 34 between insulators 36A and 36B. In various embodiments, thermal insulator 36A may comprise a ceramic, polymer, glass or a combination of any of the foregoing materials. In some embodiment, thermal insulator 36A may have a 5% to 30% porosity contributing at least partially to its thermally insulating properties. For example, suitable ceramic materials for thermal insulator 36A may comprise silicon carbide, silicon nitride, yttria stabilized zirconia, zirconia, silica and/or alumina. For example, suitable polymer materials for thermal insulator 36A may comprise silicone, bismaleimides (BMI), polyamide-imides (PAI), polyimide (PI), polyetherimides (PEI), polyetheretherketone (PEEK) and/or polyetherketoneketone (PEKK). Thermal insulator 36A may also provide electrical insulation between heating element(s) 34 and probe body 32.

Coating 38 may comprise a metallic plating that is electrically insulated from heating element(s) 34 via electrical insulator 36B and which may have hydrophobic properties. Electrical insulator 36B may comprise the same or a different material than thermal insulator 36A. Accordingly, the material of electrical insulator 36B and thermal insulator 36A may be selected to have both desirable thermal properties (e.g., thermal conductivity) and electrical properties (e.g., electrical conductivity). In cases where the same material is used for thermal insulator 36A and electrical insulator 36B, the thickness of material under heating element(s) 34 may be greater than the thickness of material over heating element(s) 34 so that electrical insulator 36B may provide a lower resistance to heat transfer than thermal insulator 36A. This arrangement may promote the heat transfer from heating element(s) 34 to hydrophobic coating 38 instead of from heating element(s) 34 to probe body 32. In various embodiments, suitable materials for electrical insulator 36B may include a polymer or combination of polymers and ceramics such as those listed above in relation to thermal insulator 36A. In some embodiments insulator 36B may comprise silicon carbide. In cases where coating 38 may be made by electroplating (to nano crystalline grain size), the surface of the silicon carbide may be doped with approximately 10-20 percent nickel powder particles which may serve a seeds for the electro-deposition process and increase thermal conductivity of the insulating layer. The use of silicon carbide as insulator 36B may be desirable because the thermal conductivity of silicon carbide is significantly higher than polymers.

In various embodiments, the thickness of thermal insulator 36A may, for example, be between about 0.01 inch and about 0.03 inch (i.e., between 0.25 mm and about 0.76 mm). In various embodiments, the thickness of electrical insulator 36B may, for example, be between about 0.003 inch and about 0.005 inch (i.e., between 0.076 mm and about 0.127 mm). The above thickness values are provided as examples only and are not intended to be limiting. In light of the present disclosure, one skilled in the relevant arts will understand that the thicknesses for insulators 36A, 36B may be calculated based on the properties of the specific materials selected and the thermal, electrical and/or other characteristics desired.

Anti-icing device 28 or part thereof may be manufactured using a direct write process where part(s) of anti-icing device 28 may be conformably deposited onto probe body 32. Such direct write process may use ink writing, laser writing, or, a torch and aperture system to fabricate patterned material traces and coatings onto complex (i.e., curved) surfaces. A print head used for direct write printing may generate a collimated, well-defined particle stream capable of fabricating relatively low profile, fine feature conductor patterns and ceramic dielectrics onto existing components. The direct write process may be used to conformably print onto 3D geometries. The direct write process may also be used to produce embedded circuitry that may integrate sensors and heaters into coatings. Direct write and other suitable deposition processes are known and therefore need not be further described herein.

As explained further below, heating element(s) 34 may be configured to generate heat from electrical energy. Accordingly, heating element(s) 34 may comprise one or more electrical resistances (e.g., traces) deposited by way of a direct write process based on the surface area on which heating is to be provided. Heating element(s) 34 may be coupled to a source of electrical power (not shown) that may drive electrical current into heating element(s) 34 to generate heat. In some embodiments, heating element(s) 34 and insulators 36A, 36B may be deposited using a direct write process so that heating element(s) 34 may be embedded into insulator 36A and/or insulator 36B.

Anti-icing device 28 may have a relatively low-profile design. For example, in various embodiments, anti-icing device 28 may, for example, have an overall thickness between about 0.015 inch and about 0.040 inch (i.e., between 0.38 mm and about 1.0 mm).

Hydrophobic coating 38 may comprise a metallic coating conformably deposited (e.g., printed) over heating element(s) 34 using a known or other direct write process or other material deposition process. In various embodiments, a thickness of hydrophobic coating 38 may be between about 0.004 inch and about 0.006 inch (i.e., about 0.1 mm to about 0.15 mm). In order to achieve hydrophobic or superhydrophobic properties, the metallic coating may be irradiated using a femtosecond laser according to known or other methods. Alternatively, hydrophobic coating may be produced by nano-crystalline grain size electroplating or other means. In some embodiments, hydrophobic coating 38 may be superhydrophobic so that it may be extremely difficult to get wet. Superhydrophobic surfaces may be characterized by exhibiting a contact angle of a water droplet exceeding 150° and a roll-off angle/contact angle hysteresis being less than 10°.

Anti-icing device 28 may also comprise one or more temperature sensors 40 (referred hereinafter as "temperature sensor 40"). Temperature sensor 40 may be disposed between hydrophobic coating 38 and probe body 32 and may be different and separate from sensor 30. For example, temperature sensor 40 may also be embedded into insulator 36A and/or insulator 36B. Temperature sensor 40 may be configured and positioned to sense a temperature of part of probe body and/or of anti-icing device 28. For example, temperature sensor 40 may be configured and positioned to sense a temperature substantially equivalent to that of coating 38. Temperature sensor 40 may be manufactured using a direct write process or other material deposition process. For example, temperature sensor 40 may be manufactured in generally the same manner as heating element(s) 34. In various embodiments, temperature sensor 40 may comprise a thermocouple and/or a resistance temperature detector (RTD).

Anti-icing device 28 may be coupled to temperature controller 42, which may be of known or other type and may be suitable for aircraft applications. In some embodiments, temperature controller 42 may not be required where EEC 20 may also serve the function of directly controlling the operation of anti-icing device 28 via the links shown in stippled lines between heating element(s) 34 and EEC 20 and between temperature sensor 40 and EEC 20. For example, the functionality of temperature controller 42 may be incorporated into EEC 20. Alternatively, a separate temperature controller 42 may be provided to control the operation of anti-icing device 28. Signals from temperature sensor 40 (i.e., feedback) may be provided to temperature controller 42 for the purpose of controlling the operation of heating element(s) 34. For example, temperature sensor 40, temperature controller 42 and heating element(s) 34 may be part of a closed control loop for controlling the current delivered to heating element(s) 34 to consequently control the heat output from heating element(s) 34. Signals from temperature sensor 40 may also be used to determine whether an icing condition exists or if conditions prone to icing exists. Such determination may be made by temperature controller 42 or by EEC 20. For example, in some embodiments EEC 20 may be coupled to temperature controller 42 so as to provide instructions to temperature controller 42 such as instructions to activate or deactivate heating element(s) 34 based on feedback from temperature sensor 40.

FIG. 3 shows a schematic representation of anti-icing device 28 having a dual channel configuration (i.e., channels A and B). For example, anti-icing device 28 may comprise heating element 34A and temperature sensor 40A associated with a first channel A and may comprise heating element 34B and temperature sensor 40B associated with a second channel B. In various embodiments, anti-icing device 28 may comprise one or a plurality of channels. In various embodiments, the number of channels may be selected to provide functional redundancy (e.g., increased reliability) and/or to provide heating to different regions of probe 22. Alternatively or in addition, the number of channels may be selected to provide different (i.e., selectable) levels of heating capacity within one or more regions of probe 22. For example, a plurality of heating elements 34 may be configured to cooperatively provide heat to a same region of probe 22 so that one or more heating elements 34 may be activated or deactivated based on the need for heating capacity in that particular region. Heating elements 34A, 34B may be configured to be independently activated and/or controlled depending on specific conditions or needs for anti-icing. In various embodiments, the ratio of heating elements 34 to temperature sensors 40 may not necessarily be one to one. For example a single temperature sensor 40 may be sufficient in a control loop comprising a plurality of heating elements 34.

Figure 4:
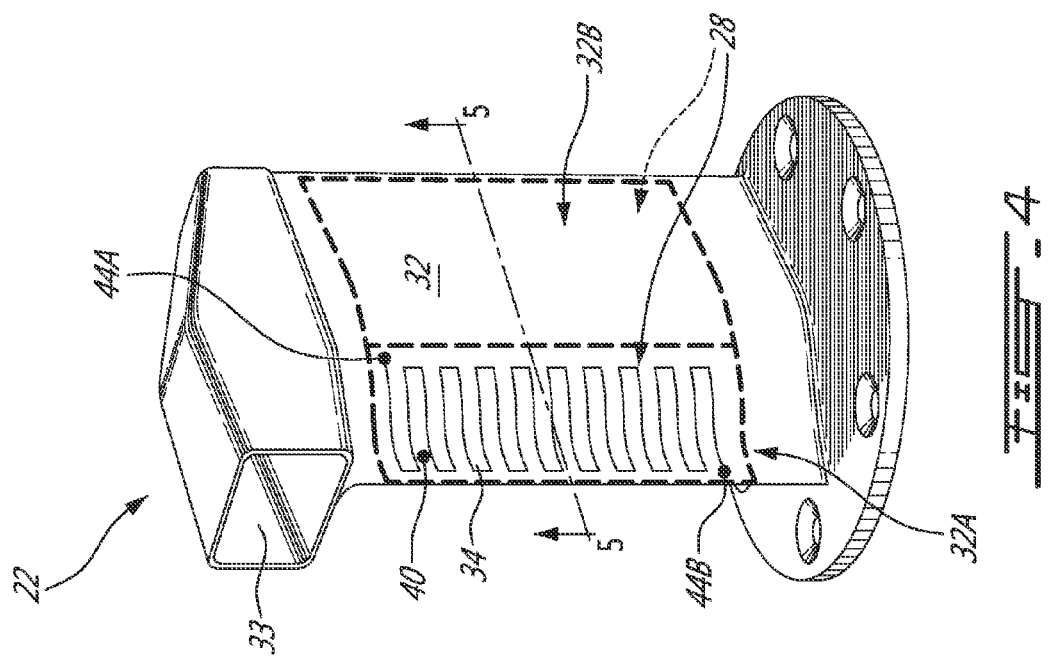
FIG. 4 shows a perspective view of an exemplary probe indicating exemplary locations where the anti-icing device of FIG. 2 may be disposed on the probe.

FIG. 4 shows a perspective view of an exemplary probe 22 indicating exemplary locations of two regions 32A. 32B of probe body 32. It is understood that many types, shapes and configurations of temperature/pressure probes exist and that various aspects of the present disclosure would be equally applicable to probes other than those specific examples illustrated herein. FIG. 4 also shows a schematic representation of an exemplary heating element 34 printed in region 32A of probe body 32. Regions 32A and 32B may each comprise one or more anti-icing devices 28 but heating element 34 and sensor 40 are shown only in region 32A for the sake of clarity. As explained above, heating element(s) 34 of anti-icing device 28 may comprise an electrically resistive circuit/pattern conformably printed onto probe body 32 so as to heat a region of interest on probe body 32. Heating element 34 may comprise first end 44A and second end 44B, which may be in electrical communication with an electrical power source (e.g., via temperature controller 42 of FIG. 3) during operation of anti-icing device 28.

Probe 22 may have different heating requirements in different regions of probe 22. For example, upstream region 32A near a leading edge and/or near inlet 33 of probe 22 may require more heating than downstream region 32B near a trailing edge of probe 22. Accordingly, an anti-icing device 28 in upstream region 32A may be configured to output more heat than an anti-icing device 28 in downstream region 32B. For example, heating element(s) 34 in different regions 32A, 32A may have different parameters such as different electrical resistances in different locations because of different printed material compositions and/or different dimensions. Also, the heating capacity in different regions 32A, 32B may be varied by having different packing densities of traces of heating element(s) 34 in the different regions 32A, 32B. Alternatively, a single heating element 34 spanning over different regions 32A, 32B may be configured to provide different heating capacities in the different regions 32A, 32B by having different parameters in the different regions 32A, 32B.

In some embodiments, anti-icing devices 28 located in different regions 32A, 32B of probe body 32 may be configured to be independently activated and/or controlled depending on specific conditions or needs for anti-icing. Alternatively, in some embodiments, an anti-icing device 28 may be included only in upstream region 32A and downstream region 32B may not contain an anti-icing device 28. The specific locations of anti-icing device 28 on probe 22 may be determined by modelling or empirically based on icing behavior of probe 22.

Figure 5:
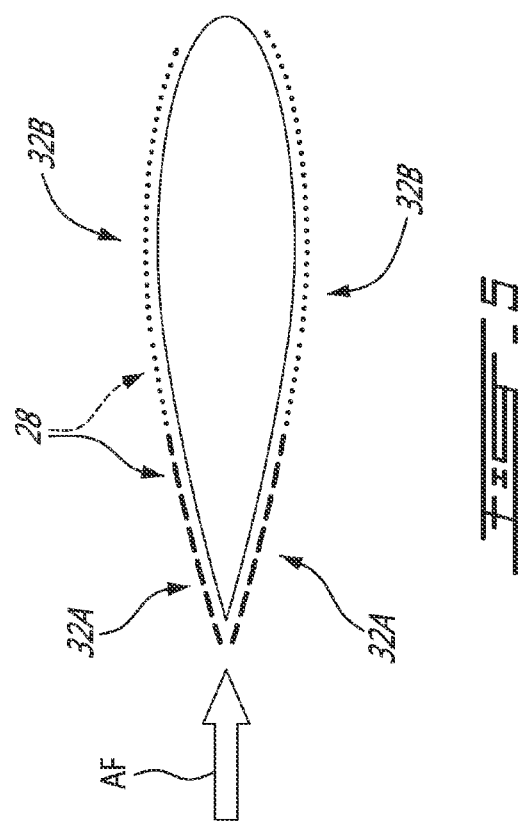
FIG. 5 is a cross-sectional profile of the probe of FIG. 4 taken along line 5-5 in FIG. 4.

FIG. 5 is a cross-sectional profile of the probe of FIG. 4 taken along line 5-5 in FIG. 4. In this specific example, probe 22 has cross-sectional profile that is generally airfoil-shaped. FIG. 5 also shows the relative locations, using different styles, of stippled lines of upstream region 32A of probe body 32 and of downstream region 32B of probe body 32.

FIG. 6 shows a perspective view of part of probe 22 of FIG. 4 including inlet 33. For some configurations of probe 22, it may be desirable to have anti-icing device 28 disposed near air inlet 33, near pressure port(s) or in any other area(s) prone to icing so as to prevent an ice formation from blocking inlet 33 for example. Probe 22 may comprise one or more regions (e.g., 32A-32I) near inlet 33 where anti-icing device(s) 28 may be disposed. For example, in some embodiments, anti-icing device(s) 28 may be disposed on an inside wall of inlet 33 (e.g., see regions 32F-32I) and/or on an outside wall of inlet 33 (e.g., see regions 32E and 32D). Accordingly, in some embodiments, anti-icing device(s) 28 may be disposed on an inside wall and on an opposite outside wall of inlet 33.

FIG. 7 shows a perspective view of another exemplary probe 22 indicating exemplary locations of two regions 32A, 32B of probe body 32. Regions 32A and 32B may each comprise one or more anti-icing devices 28 of the type described above. The detailed construction of anti-icing device(s) 28 is not depicted in FIG. 7. Probe 22 may have different heating requirements in different regions of probe 22. For example, upstream region 32A near a leading edge of probe 22 may require more heating than downstream region 32B near a trailing edge of probe 22. Accordingly, an anti-icing device 28 located in upstream region 32A may be configured to output more heat than an anti-icing device 28 in downstream region 32B as described above in relation to FIG. 4. In some embodiments, anti-icing devices 28 located in different regions 32A, 32B of probe body 32 may be configured to be independently activated and/or controlled depending on specific conditions or requirements for anti-icing. Alternatively, in some embodiments, an anti-icing device 28 may be included only in upstream region 32A and downstream region 32B may not contain an anti-icing device 28. The specific locations of anti-icing device 28 on probe 22 may be determined by modelling or empirically based on icing behavior of probe 22. For example, for some configurations of probe 22, it may be desirable to have anti-icing device 28 disposed near air inlet 33 and/or outlets 35 or in any other area prone to icing.

FIG. 8 is a cross-sectional profile of the probe of FIG. 7 taken along line 7-7 in FIG. 7. FIG. 8 also shows the relative locations, using different styles of stippled lines, of upstream region 32A of probe body 32 and of downstream region 32B of probe body 32.

FIG. 9 shows a perspective view of part of probe 22 of FIG. 7 including inlet 33 and outlets 35. Probe 22 may comprise one or more regions (e.g., 32A-32C) such as near inlet 33 and outlets 35 where anti-icing device 28 may be disposed so as to prevent an ice formation from blocking inlet 33 and/or outlet(s) 35. For example, in some embodiments, anti-icing device 28 may be disposed in region 32C surrounding inlet 33 where region 32C may comprise a surface that is substantially parallel to airflow AF.

During operation, anti-icing device 28 may prevent icing of probe 22 or part(s) thereof in some environmental conditions. Conventional anti-icing approaches which input significant amounts of heat into the body of probes may be effective in preventing ice formations from occurring but may also affect the temperature measurements acquired by such probes. Conversely, in some embodiments, the hybrid anti-icing approach disclosed herein combines the use of heating element(s) 34 and hydrophobic or superhydrophobic coating 38, where heating element(s) 34 may be disposed between differential thermally insulating layers, to provide anti-icing capability without significantly affecting the accuracy of a temperature measurement acquired via sensor 30. Specifically, hydrophobic coating 38 may cause water to bead and run off hydrophobic coating 38. However, with hydrophobic coating 38 alone, super cooled water droplets and freezing water droplets could still freeze on hydrophobic coating 38 in some conditions. The electrical heating provided by heating element(s) 34 may cause such ice to melt so that the resulting water may bead and run off the hydrophobic coating 38. Accordingly, the amount of heat provided by heating element(s) 34 may not need to cause the water to evaporate but may be only sufficient to cause some melting of the ice formed on coating 38. Also, in some conditions, the use of hydrophobic coating 38 alone may be sufficient and electric heating via heating element(s) 34 may be used only when required.

Since heating element(s) 34 is thermally insulated from probe body 32, heat from heating element(s) 34 is mainly directed toward hydrophobic coating 38 (i.e., more localized heating) and may consequently, reduce unwanted temperature increase of large portions (or the entirety) of probe body 32 during heating and therefore may reduce the impact on the temperature measurement(s) acquired via sensor 30. Since hydrophobic coating 38 may comprise a relatively thin metallic coating, its thermal mass may be several orders of magnitude lower than that of probe body 32. Further, since hydrophobic coating 38 may be thermally insulated from probe body 32, the power required to cause the ice to melt may be relatively low in comparison with conventional anti-icing approaches. Furthermore, the use of temperature sensor(s) 40 in regions of probe body 22 more prone to icing (e.g., air inlets 33 or leading edges) may permit active anti-icing control of specific regions of probe body 32 in order to further reduce power consumption and thereby further reduce the risk of inaccuracies in temperature measurement(s) acquired via sensor 30.

The above description is meant to be exemplary only, and one skilled in the relevant arts will recognize that changes may be made to the embodiments described without departing from the scope of the invention disclosed. Also, one skilled in the relevant arts will appreciate that while the devices and methods disclosed and shown herein may comprise a specific number of elements/steps, the devices and methods could be modified to include additional or fewer of such elements/steps. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A sensor probe with anti-icing, the sensor probe comprising:
   a probe sensor;
   a probe body housing the probe sensor and configured to extend into an airflow; and
   an anti-icing device bonded to and covering at least part of the probe body for preventing ice from forming on the probe body, the anti-icing device defining an outer surface for exposure to the airflow and comprising a heating element thermally insulated from the probe body and electrically insulated from the outer surface;
   wherein the probe sensor is configured to provide at least one of the following: a signal representative of a temperature associated with the airflow and a signal representative of a pressure associate with the airflow.

2. The sensor probe as defined in claim 1, comprising a hydrophobic coating covering the heating element for being heated by the heating element, the hydrophobic coating defining the outer surface.

3. The sensor probe as defined in claim 1, wherein the anti-icing device covers an upstream region of the probe body.

4. The sensor probe as defined in claim 1, wherein heating element is thermally insulated from the probe body by a polymeric material.

5. The sensor probe as defined in claim 1, wherein the heating element is disposed between a ceramic material and a polymeric material.

6. The sensor probe as defined in claim 2, wherein the hydrophobic coating is superhydrophobic.

7. The sensor probe as defined in claim 1, wherein the probe sensor is a temperature sensor.

8. The sensor probe as defined in claim 1, wherein the anti-icing device conforms to a shape of the probe body.

9. The sensor probe as defined in claim 1, comprising two heating elements arranged in two separate channels.

10. The sensor probe as defined in claim 1, wherein the anti-icing device comprises a temperature sensor.

11. The sensor probe as defined in claim 2, wherein the hydrophobic coating comprises a metallic material electrically insulated from the heating element.

12. A temperature probe with anti-icing for extending into a gas path of a gas turbine engine, the temperature probe comprising:
   a temperature sensor;
   a probe body housing the temperature sensor and configured to extend into the gas path of the gas turbine engine and be exposed to an airflow; and
   an anti-icing device bonded to and covering at least part of the probe body for preventing ice from forming on the probe body, the anti-icing device comprising:
   a heating element thermally insulated from the probe body; and
   a hydrophobic coating covering the heating element for being heated by the heating element, the hydrophobic coating being electrically insulated from the heating element and defining an outer surface for exposure to the airflow.

13. The temperature probe as defined in claim 12, wherein the heating element is disposed between a ceramic material and a polymeric material.

14. A method of manufacturing an anti-icing device bonded to and covering at least part of a probe body of a sensor probe for extending into an airflow, the method comprising:

installing a heating element on the probe body and thermally insulating the heating element from the probe body;

covering the heating element with a coating defining an outer surface for exposure to the airflow; and electrically insulating the coating from the heating element.

15. The method as defined in claim 14, wherein the coating is hydrophobic.

16. The method as defined in claim 14, comprising depositing a thermally insulating material on the probe body before installing the heating element.

17. The method as defined in claim 14, wherein installing the heating element comprises depositing the heating element using a direct write process.

18. The method as defined in claim 14, comprising installing a temperature sensor of the anti-icing device before covering the heating element with the coating.

* * * * *